United States Patent [19]

Warden

[11] Patent Number: 4,712,227
[45] Date of Patent: Dec. 8, 1987

[54] X-RAY FILM HOLDER AND METHOD OF OPERATING SAME FOR OPTIONAL FLUOROSCOPIC OR RADIOGRAPHIC EXAMINATION OF A PATIENT

[75] Inventor: Hans-Erik Warden, Upplands Vaesby, Sweden

[73] Assignee: Siemens Aktiengesellschaft, Berlin and Munich, Fed. Rep. of Germany

[21] Appl. No.: 781,451

[22] Filed: Sep. 30, 1985

[30] Foreign Application Priority Data

Oct. 4, 1984 [DE] Fed. Rep. of Germany ....... 3436427

[51] Int. Cl.$^4$ ............................................. G03B 42/02
[52] U.S. Cl. .................................... 378/173; 378/167
[58] Field of Search ............... 378/145, 154, 155, 167, 378/171, 173, 176, 182, 185, 188; 250/482.1

[56] References Cited

U.S. PATENT DOCUMENTS

| | | | |
|---|---|---|---|
| 3,636,351 | 1/1972 | Lajus | 378/173 |
| 4,199,687 | 4/1980 | Brendl et al. | 378/171 |
| 4,217,500 | 8/1980 | Bombray et al. | 378/185 |
| 4,253,028 | 2/1981 | DeBruin et al. | 378/173 |

Primary Examiner—Craig E. Church
Assistant Examiner—John C. Freeman
Attorney, Agent, or Firm—Hill, Van Santen, Steadman & Simpson

[57] ABSTRACT

An X-ray film holder which permits optional fluoroscopic or radiographic examination of a patient has a number of screen foils disposed in a film conveying track wherein X-ray film is provided between a supply magazine and a take-up magazine. The film changer is disposed between the patient and an X-ray image intensifier, the changer and the intensifier having the same image axis. The film changer has a conveyor unit for moving the screen foils into place in front of the image intensifier and for automatically opening overlapping flaps of the screen to permit an X-ray film sheet to be moved therebetween. As needed, the screen foils can be conveyed in an opposite direction to a storage area to permit radiation to pass unobstructed to the image intensifier for fluoroscopic examination of the patient.

19 Claims, 4 Drawing Figures

X-RAY FILM HOLDER AND METHOD OF OPERATING SAME FOR OPTIONAL FLUOROSCOPIC OR RADIOGRAPHIC EXAMINATION OF A PATIENT

BACKGROUND OF THE INVENTION

1. Field of the Invention

The present invention relates to a film changer for an X-ray examination diagnostics installation, and a method for operating the film changer, and in particular to such a film changer and method for operating same which permits optional examination of a patient by radiographic or fluoroscopic means.

2. Description of the Prior Art

Frequently during X-ray examination of a patient, the desire to switch from one mode of examination, such as radiographic examination, to another mode of examination, such as fluoroscopic examination, is desired. As used herein, radiographic examination means the generation of a static shadowgraph, while the term fluoroscopy as used herein refers to generation of a dynamic X-ray image. During fluoroscopic examination, no components which may attenuate the incident radiation can be present in front of the X-ray image intensifier. As described in European patent application No. ER 0,003 691 B 1, an X-ray examination apparatus has an X-ray image intensifier and an X-ray film changer disposed at fixed positions relative to each other, and the recording unit has a recording window for use with the X-ray image intensifier and a pressure plate for maintaining screen foils used in radiographic examinations in place. The screen foil is manually withdrawn from the film changer when fluoroscopic examination is desired. This permits the x-radiation to proceed unimpeded to the X-ray image intensifier through the X-ray film changer.

In angiographic examinations, a contrast agent is injected into the blood vessels of a patient and is tracked using the X-ray image intensifier. If the physician or technician wishes to quickly make an X-ray shadowgraph or radiograph during such an examination, the exposure and its associated components must again be inserted. This may take such a long time, given conventional devices, that the desired radiograph cannot be made in time. Such an X-ray apparatus is therefore not suitable for examinations wherein a rapid change between radiographic and fluoroscopic examinations may be moving.

A film changer is disclosed in U.S. Pat. No. 4,199,687 which permits switching between a radiographic examination mode and a fluoroscopic examination mode. For this purpose, screen foils used in the radiographic examination are secured to a long conveyor belt by means of which the foils are transported into the recording unit or out of the recording unit, as needed. Each conveyor belt is actuated by a transport device having deflection rolls, auxiliary rolls, and take-up rolls. In order to permit the film conveying track to be free between the supply and takeup magazines, the conveyor with the rolls for upper screen foil is attached above the film conveying track, and the conveyor belt with the rolls for the lower screen foil is attached below the film conveying track. This device is mechanically complex and space-consuming, with the result that the film changer as a unit is relatively bulky. Moreover, the screen foils, in particular the lower screen foil, are difficult to access. A further disadvantage is that the screen foils must be loosened from the conveyor belt when being cleaned and replaced.

SUMMARY OF THE INVENTION

It is an object of the present invention to provide a film changer for an X-ray diagnostic installation which permits a rapid and automatic change between a radiographic examination mode and fluoroscopic examination mode.

It is a further object of the present invention to provide such a film changer which further permits simple and fast replacement of the screen foils used in the radiographic examination mode.

It is a further object of the present invention to provide a method for operating such a film changer.

The above objects are inventively achieved in a film changer which conveys loose screen foils to and from a position for radiographic examination. The foils are loose, i.e., not permanently attached to the conveyor device, as a consequence of which a change over between the radiographic and fluoroscopic examination modes can be undertaken quickly and the screen foils additionally can easily be removed as needed.

In a further embodiment of the invention, one of the screen foils crosses the film conveying track when being moved into and out of the recording position. This permits the screen foils to be stored in a common magazine during fluoroscopic examination, when the foils are not needed, resulting in a simple and space-saving unit.

In another embodiment of the invention, the film changer includes at least one motor-driven drive capstan and at least one capstan idler for the film transport from a storage magazine to the recording position. The capstan idler is disposed at an edge region of the film in the direction of film conveyance. The drive capstan and the capstan idler simultaneously function as the conveyor means for the screen foils. The rotational direction of the drive capstan is reversable and the screen foils are provided with extensions at each end thereof, the extensions being reduced in width, so as not to be seized by the idler rollers. The screen foils are thereby displaced only to the extent of being in engagement with the conveyor device. Rapid and automatic movement of the screen foils is thus possible without the necessity of additional conveyor belts and rolls.

In another embodiment of the invention, the foil transport device is directly coupled to the film conveyor device, thereby resulting in no additional space for the foil conveyor within the film changer.

The device may further include a dog arm coupled to the conveyor device which runs freely in one rotational direction of the drive capstans which causes conveyance of the film into the recording region, and the dog arm is pivoted in the opposite direction so as to come into engagement with the extension of the screen foils when it is desired to remove the screen foils for fluoroscopic examination. Movement of the dog arm conveys the screen foils into a storage position in a simple manner.

At least one further capstan idler may be provided disposed in front of the aforementioned capstan idler in the film transport direction. When the rotational direction of the drive capstan changes to the opposite direction for moving the screen foils out of the recording position, the second capstan idler moves away from the drive capstan which permits the screen foils to be conveyed between the drive capstan and the second capstan idler without substantial friction.

The extensions of the screen foils may be provided with detents which are moved into engagement with each other and with the dog arm. The dog arm will thereby reliably grasp the screen foils and move them into the storage position.

The material comprising the extensions of the screen foils may be magnetic, and magnets may be disposed in the film changer for aiding in separating the extensions so as to permit insertion of a film sheet therebetween. This further facilitates transfer of the X-ray film from a storage magazine to a recording position.

The extensions of the screen foils may also function as guides for the X-ray film, thereby eliminating the need for any additional film guides within the structure of the film changer itself.

DESCRIPTION OF THE PREFERRED EMBODIMENTS

Figure 1:
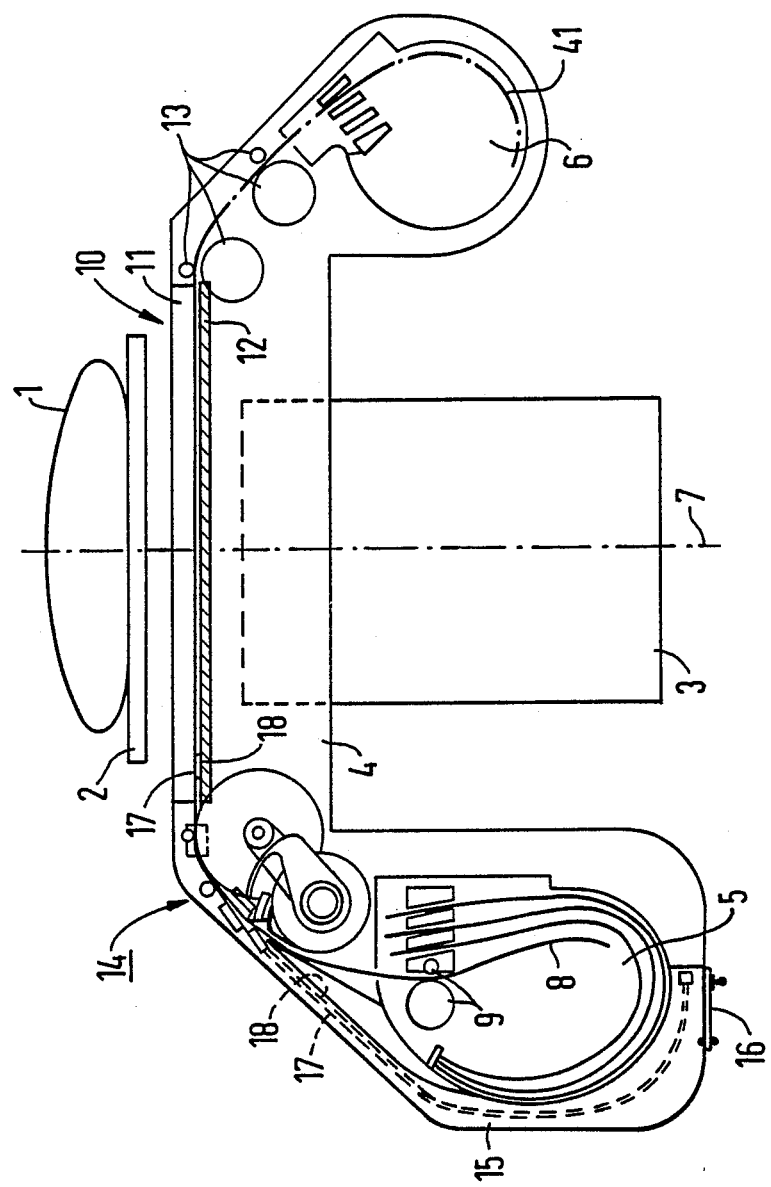
FIG. 1 is a side view, partly in section, of an X-ray examination installation having a film changer constructed and operable in accordance with the principles of the present invention.

An X-ray diagnostics installation having a film changer constructed in accordance with the principles of the present invention, and operable according to the method disclosed herein, is shown in FIG. 1. A patient 1 is disposed on an X-ray transmissive patient support 2. An X-ray image intensifier 3 is disposed beneath the patient support which is followed in a known manner by a video chain (not shown) for generating fluoroscopic images. An X-ray film changer 4 having a supply magazine 5 and a take-up magazine 6 for sheets of X-ray film is used for producing radiographic pictures (shadowgraphs). A supply and take-up mechanism of this type is described, for example, in German OS No. 31 04 670. The X-ray image intensifier 3 and the X-ray film changer 4 have the same image axis 7 which extends centrally through the recording field or recording position of the film changer 4.

For generating X-ray shadowgraphs with the assistance of the film changer 4, a sheet 8 of X-ray film is conveyed from the supply magazine 5 by conveyor rollers 9 and is thereby conveyed to the recording position 10 by further conveyor means described in detail below. Pressure plates 11 and 12 for screen foils 17 and 18, also described in greater detail below, are the only portions of the recording unit 10 shown in FIG. 1. After an exposure, the sheet 8 of X-ray film is conveyed to the take-up magazine 6 by a further conveyor rollers 13. The dot-dash line 41 indicates the path of the sheet 8.

For using the X-ray image intensifier 3 to generate a fluoroscopic image, the screen foils 17 and 18 are moved out of the recording field 10 by conveyor devices 14 and 14a described in connection with FIGS. 3 and 4 into a storage magazine 15. The position of the foils 17 and 18 is indicated with dashed lines. No portions attenuating the X-radiation are present in the image field of the recording unit 10 during fluoroscopy, so that unobstructed examination of the patient 1 in the fluoroscopic mode can be undertaken. When a radiographic picture is to be quickly made, the screen foils 17 and 18 are conveyed back to the recording unit 10 by the conveyor devices 14 and 14a.

The lower portion of the storage magazine 15 has an opening with a cover 16 through which the foils 17 and 18 can be reached and removed from the storage magazine 15. This permits rapid and simple changing of the foils 17 and 18.

Figure 2:
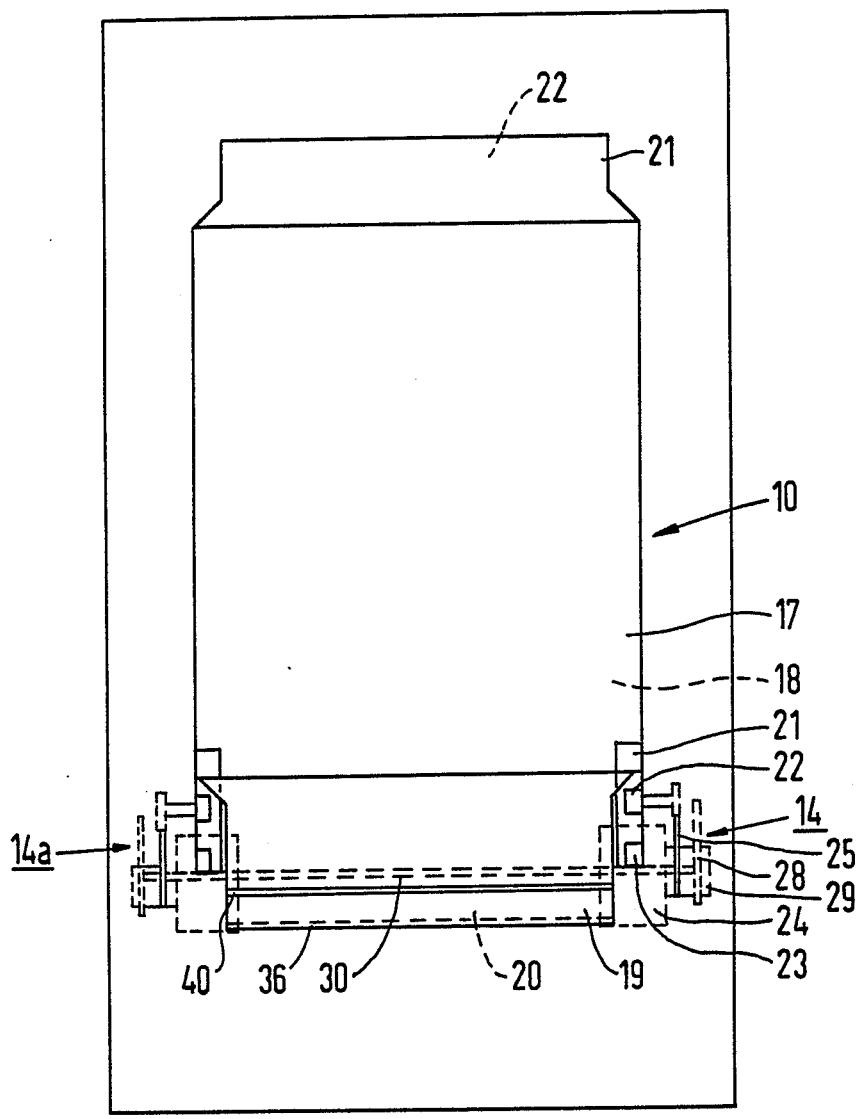
FIG. 2 is a plan view of the film changer shown in FIG. 1.

As shown in FIG. 2, the X-ray film changer 4 has two conveyor devices 14 and 14a disposed on opposite sides thereof for conveying sheets 8 of X-ray film as well as for conveying the screen foils 17 and 18. The conveyor devices 14 and 14a are synchronously operated. As also seen in FIG. 2, the screen foils 17 and 18 have overlapping extensions 19 and 20 and overlapping extensions 21 and 22. The extensions 19, 20, 21 and 22 project beyond the area of the recording unit 10 when the foils are in place within that unit, and have a reduced width such that the extensions are not engaged by the conveyor devices 14 and 14a, i.e., the extensions have a width less than the width of the remainder of the foils, and less than the width of the film sheets.

Figure 3:
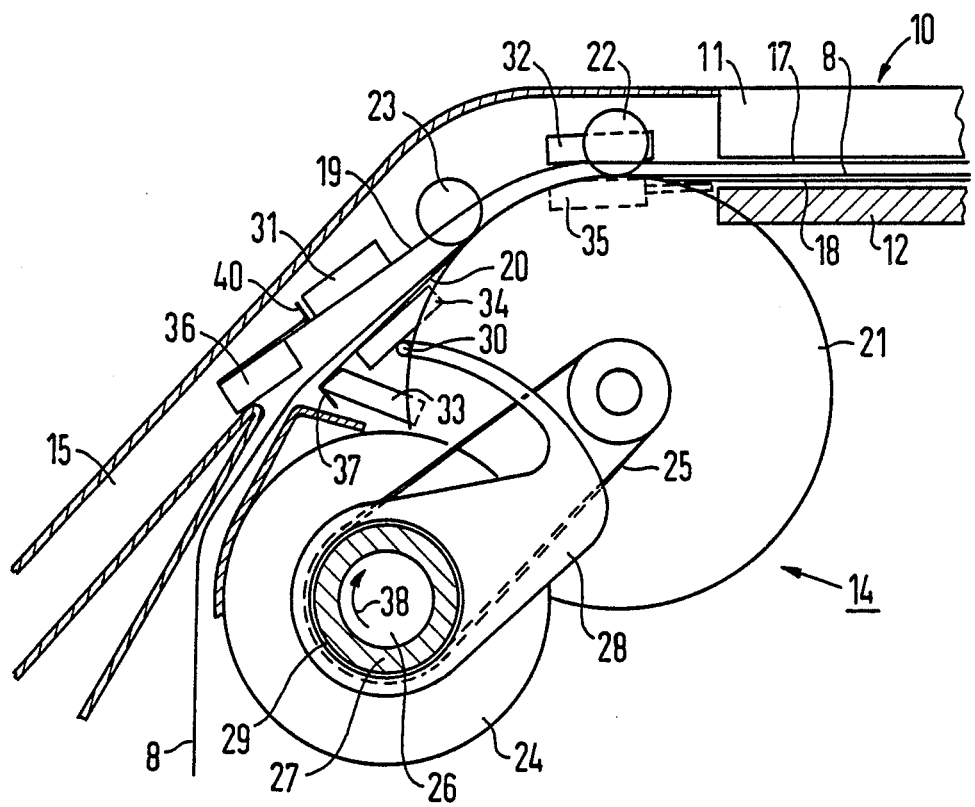
FIG. 3 is an enlarged side sectional view of a portion of the film changer shown in FIG. 1 during a first stage of operation.
Figure 4:
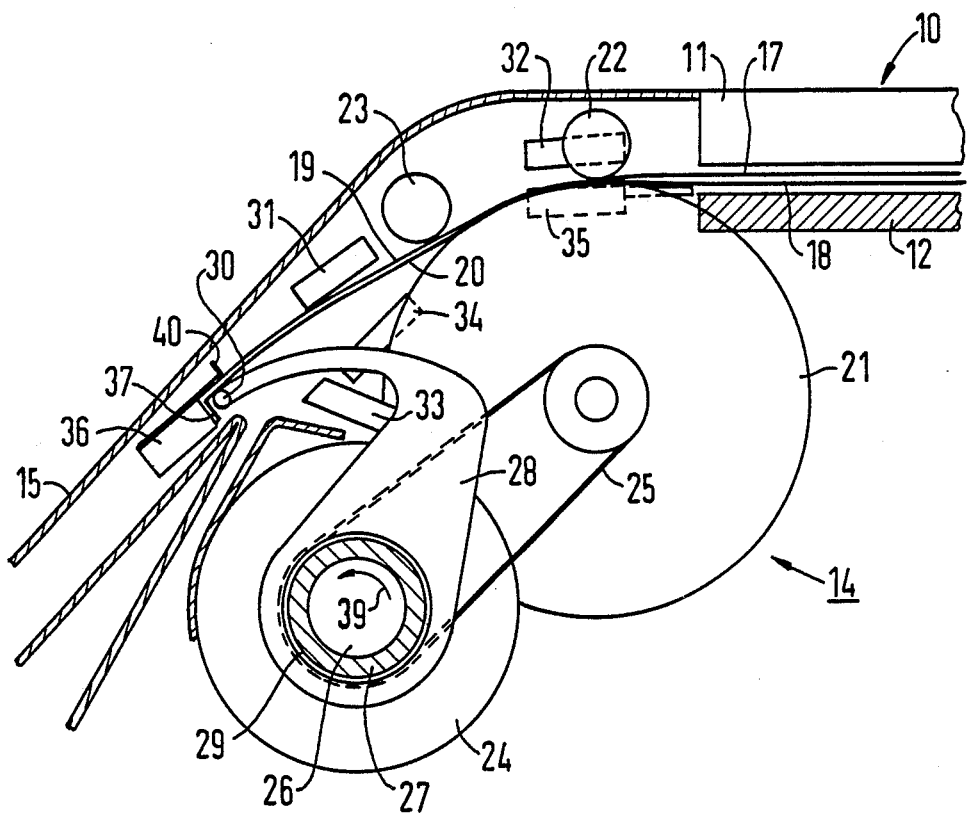
FIG. 4 is an enlarged side sectional view of a portion of the film changer shown in FIG. 1 in a second stage of operation.

A first stage of operation of the conveyor devices 14 and 14a is shown in FIG. 3. Each device has a motor-driven drive capstan 21 and capstan idlers 22 and 23. The capstan 21 is connected to a motor 24 by a transmission means 25, such as chain. A freely rotating wheel 27 is connected to the shaft 26 of the motor 24. A dog arm 28 is mounted on the wheel 27 by a slip clutch. The dog arm 28 has a cross bar 30 which extends across the width of the film changer to the other transport device 14a on the opposite side thereof.

The material comprising the extensions 19 and 20 of the foils 17 and 18 is magnetic. Additionally, magnets 31 and 32 are mounted in the region of the extensions 19 and 20 for separating the extensions 19 and 20 when the screen foils 17 and 18 are in the recording position in the recording unit 10. The magnets 31 and 32 pull the extension 19 upwards as seen in FIG. 3. The magnets 33 and 34 as well as magnet 35 pull the extension 20 downwards as seen in FIG. 3. The magnets 31 and 33 also function as detents for the extensions 19 and 20. The ends of the extensions 19 and 20 are provided with additional detents 36 and 37. The extension 19 has one additional detent 40. By separating the extensions 19 and 20, the sheets 8 of X-ray film can be easily conveyed between the foils 17 and 18 from the supply magazine 5 to the recording unit 10. The extensions 19 and 20 thereby simultaneously serve as film guides.

When an X-ray radiograph is to be made, a sheet 8 of X-ray film is conveyed out of the supply magazine by the conveyor rollers 9 and is disposed between the drive capstan 21 and the capstan idler 23. Via the shaft 26, the motor 24 rotates the wheel 27 and the chain 25 in the direction of the arrow 38, so that the drive capstan 21 is rotated clockwise. The dog arm 28 and the slip clutch 29 run free in this rotational direction of the motor shaft 21 so that the dog arm 28 remains in the position shown in FIG. 3 during film transport into the recording unit 10. Simultaneously, the drive capstan 21 and the capstan idler 23 convey the sheet 8 of X-ray film to the capstan idler 22, and further to the recording unit 10 where an exposure is made. When fluoroscopic examination of the patient 1 is to be undertaken with the X-ray image intensifier 3, the screen foils must be conveyed out of the recording field 10. This is undertaken by the motor 24 reversing direction of rotation and thereby changing the direction of rotation of the shaft 26 so that the wheel 27 and the drive capstan 21 rotate as well in the opposite direction, as indicated by the arrow 39 in FIG. 4. The freely rotatable wheel 27 now engages the one-way slip clutch 29 and the dog arm 28, causing the dog arm 28 to be rotated in the same direction, as also shown in FIG. 4. The cross bar 30 of the dog arm 28 thereby presses the extension 20 of the screen foil 18 against the extension 19 and thus comes into engagement with both extensions 19 and 20 due to the detents 36 and 37. The extensions 19 and 20 are displaced by the bar 30 to such an extent that the drive capstan 21 and the capstan idler 22 engage the screen foils 17 and 18. The drive capstan 21 and the capstan idlers 21 and 22 convey the screen foils 17 and 18 until they are no longer in engagement therewith. The additional capstan idler 23 is disposed such that it lifts off from the drive capstan 21 given the rotational direction which is opposite to the direction needed for film transport into the recording unit 10. The ends of the screen foils 17 and 18 therefore come to be disposed between the capstan idlers 22 and 23. Fluoroscopic examination of the patient 1 can now be undertaken. If an X-ray radiograph is to be quickly made, the screen foils 17 and 18 are conveyed back to the recording field 10. This occurs in that the capstan idler 23 presses the screen foil 17 and 18 against the drive capstan 21 which, as described in connection with FIG. 3, now rotates clockwise. The screen foils are conveyed until they have departed the capstan idlers 23 and 22 and the stops 37 and 40 of the extensions 19 and 20 have reached the magnets 31 and 34. The dog arm 28 assumes the rest position shown in FIG. 1.

Although modifications and changes may be suggested by those skilled in the art it is the intention of the inventor to embody within the patent warranted hereon all changes and modifications as reasonably and properly come within the scope of his contribution to the art.

I claim as my invention:

1. A method for operating a film changer having a recording unit disposed in front of an X-ray image intensifier in an X-ray diagnostics installation for changing between a radiographic examination mode of a subject and a fluoroscopic examination mode of the subject comprising the steps of:
    moving loose overlapping screen foils from a storage magazine in said changer to said recording unit;
    moving an X-ray film sheet along a track in said changer and between said foils in said recording unit for generating a radiographic image;
    moving said film sheet to a take-up magazine in said changer; and moving said foils to said storage magazine leaving said recording unit unobstructed for generating a fluoroscopic image using said image intensifier.

2. A method as claimed in claim 1 wherein the step of moving said screen foils is further defined by moving at least one of said screen foils across said track.

3. A method as claimed in claim 1 wherein the steps of moving said screen foils and moving said film sheet between said foils are further defined by automatically moving said screen foils and said film sheets in sequence with a common conveying device.

4. A method as claimed in claim 1 comprising the additional step of:
    automatically spreading overlapping ends of said foils for facilitating moving said X-ray film sheet therebetween.

5. A method as claimed in claim 4 wherein said film changer has a pair of spaced magnetic detents disposed at an entrance to said recording unit and wherein said end of said foils is comprised of magnetic material, and wherein the step of spreading said overlapping ends is further defined by:
    stopping movement of said foils into said recording unit with said overlapping ends comprised of magnetic material disposed adjacent said magnetic detents; and
    magnetically attracting said overlapping ends of said foils with said magnetic detents for spreading said ends.

6. A method as claimed in claim 4, wherein each of said foil ends has a detent thereon, a foil nearest said subject having a further detent at said end thereof, and wherein said changer has a pair of spaced stops disposed at an entrance to said recording unit, and wherein the step of spreading said overlapping ends of said foils is further defined by:
    catching said detents on said ends of said foils respectively against said stops; and
    resting said further detent on said foil nearest said subject against said track and lifting said foil nearest said subject away from the other foil.

7. A method as claimed in claim 4 wherein the step of automatically spreading said ends of said foils is further defined by:
    automatically simultaneously mechanically and magnetically spreading said overlapping ends of said foils for facilitating moving said X-ray film sheet therebetween.

8. A method as claimed in claim 4 comprising the additional step of:
    pushing said ends of said foils back together before moving said foils to said storage magazine for operation of said installation in said fluoroscopic examination mode.

9. A film changer for an X-ray diagnostics installation for supporting an X-ray film sheet between overlapping screen foils in a first mode for generating a radiographic image of a subject on said film and for use with an X-ray image intensifier in a second mode for generating a fluoroscopic image of said subject comprising:
    a recording unit disposed in front of said image intensifier and in which said film sheet is disposed for generating said radiographic image;
    a film storage magazine disposed on one side of said recording unit and communicating therewith via a film track, said film storage magazine containing at least one unexposed X-ray film sheet;
    a film take-up magazine disposed on an opposite side of said recording unit for receiving and storing exposed X-ray film sheets from said recording unit;
    means for moving a film sheet from said storage magazine to said recording unit for radiographic exposure therein;
    means for moving the exposed film sheet from said recording unit to said take-up magazine; a screen foil storage magazine disposed on said one side of said recording unit in which said screen foils are stored during said second mode;
    means for automatically moving said foils from said foil storage magazine to said recording unit in said first mode with one of said foils crossing said film track;

means for automatically spreading said foils for receiving an unexposed film sheet therebetween via said film track from said film storage magazine; and means for automatically returning said foils to said foil storage magazine after a radiographic exposure of said film.

10. A film changer as claimed in claim 9 wherein said means for moving said film sheet from said storage magazine and said means for moving said foils from said foil storage magazine are a common unit operating simultaneously on said foils and said film sheet.

11. A film changer as claimed in claim 9 wherein each of said foils has end extensions consisting of magnetic material and wherein said means for automatically spreading said foils is a means for magnetically attracting said foil extensions.

12. A film changer as claimed in claim 9 wherein said means for automatically spreading said foils comprises:
a pair of spaced magnets disposed in said film changer at an entrance to said recording unit; and
extensions of said foils at respective overlapping ends thereof consisting of magnetic material, said extensions being attraced to said spaced magnets when said foils are disposed in said recording unit and spreading said ends for receiving a film sheet therebetween.

13. A film changer as claimed in claim 9, wherein said means for automatically spreading said foils comprises:
a pair of spaced stops disposed in said film changer at an entrance to said recording unit;
first detents carried at overlapping ends of respective foils disposed for abutting said stops when said foil sheets are moved to a selected position in said recording unit: and
a second detent carried beneath one of said screen foils nearest said subject, said second detent disposed for resting against said track when said first detents abut said stops for lifting an end of said screen foil nearesr said subject away from the other screen foil for receiving a film sheet therebetween.

14. A film changer as claimed in claim 9 wherein said means for moving a film sheet from said storage magazine to said recording unit and said means for moving said foils from said foil storage magazine to said recording unit comprise the combination of:
a drive capstan disposed between said film track and an entrance to said recording unit;
a capstan idler disposed adjacent said drive capstan and forming a nip therewith for receiving said screen foils and said film sheet; and
extensions carried at respective overlapping ends of said screen foils, said extensions having a width less than a width of the remainder of said foil screens and less than a width of said film sheets such that after said foil screens are moved into said recording unit through said nip, said drive capstan and said idler capstan no longer engage said screen foils and subsequently engage said film sheets for moving said film sheets through said nip and into said recording unit between said foils.

15. A film changer as claimed in claim 14 further comprising:
a second idler capstan disposed adjacent said drive capstan for moving said foils and said film sheets into said recording unit, and lifting away from said drive capstan for moving said foils back into said foil storage magazine.

16. A film changer as claimed in claim 14 further comprising means for reversing the rotational direction of said drive capstan for moving said foils back into said foil storage magazine.

17. A film changer as claimed in claim 14 furhter comprising means for pushing said foils together before moving said foils back into said foil storage magazine.

18. A film changer as claimed in claim 17, wherein said means pushing said foils together comprises:
a bi-directional motor, said motor also driving said drive capstan;
a dog arm disposed beneath said foils at an entrance to said recording unit; and
a slip clutch connected said dog arm to a drive shaft of said motor such that said dog arm moves against said foils only during one rotational direction of said motor,
said motor operating in a forward direction for driving said drive capstan for moving said screen foils and said film into said recording unit, and operating in a reverse direction for pushing said dog arm via said slip clutch against said foils to move said foils together and simultaneously drive said drive capstan in said reverse direction to return said foils to said foil storage magazine.

19. A film changer as claimed in claim 9 further comprising:
a closeable opening in said foil storage magazine for manually removing said screen foils therefrom.

* * * * *